Nov. 19, 1935.  H. C. CRANDALL  2,021,646
AUTOMATIC TIRE INFLATER
Filed Dec. 21, 1932
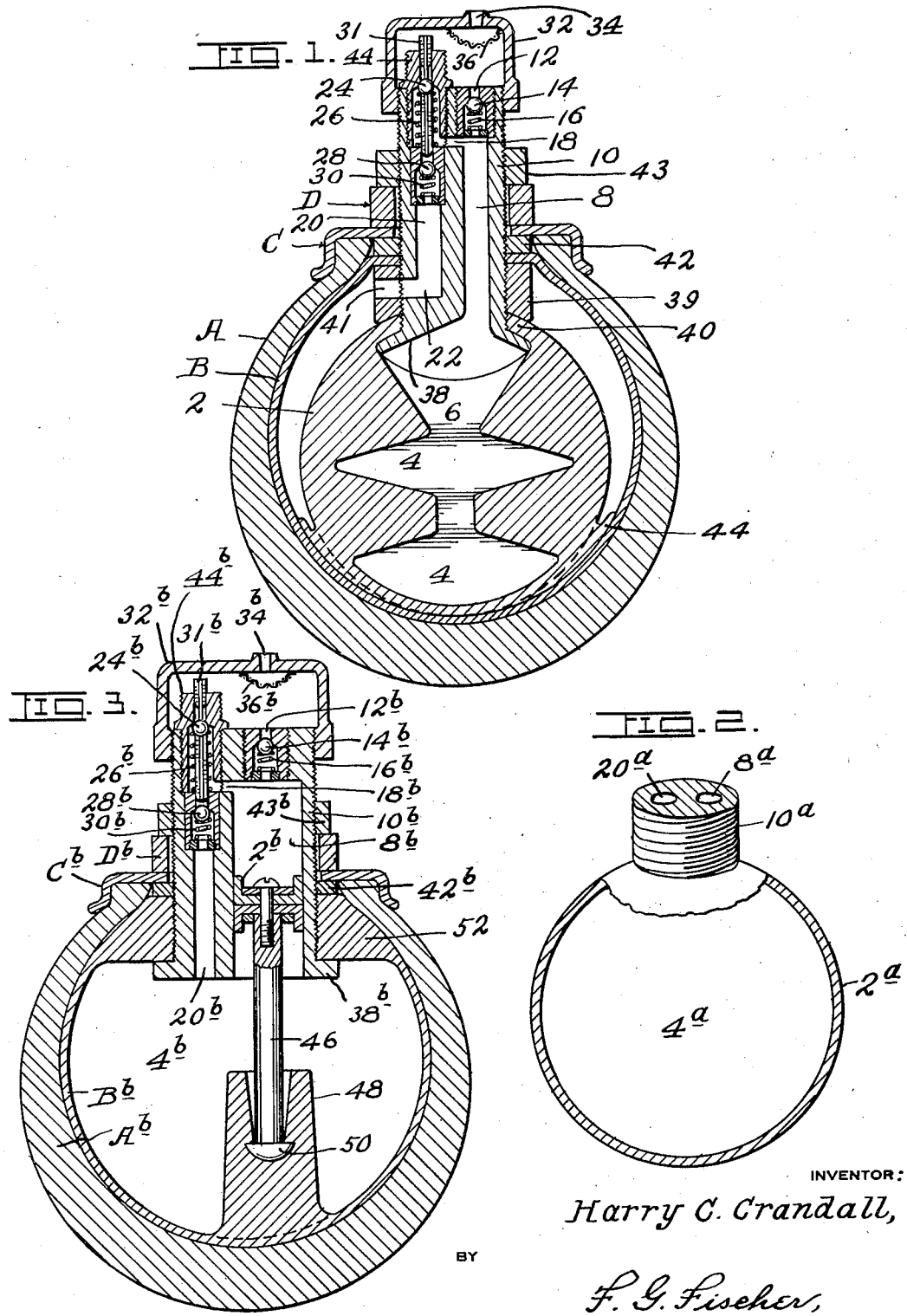
INVENTOR:
Harry C. Crandall,
BY
F. G. Fischer,
ATTORNEY.

Patented Nov. 19, 1935

2,021,646

UNITED STATES PATENT OFFICE 2,021,646

AUTOMATIC TIRE INFLATER

Harry C. Crandall, Kansas City, Kans.

Application December 21, 1932, Serial No. 648,230

3 Claims. (Cl. 152—11)

This invention relates to automatic tire inflaters and one object of the present invention is to provide a new and efficient device of this character for automatically pumping air into a pneumatic tire while the same is traveling on the road.

Another object is to provide novel signalling means which will indicate when the tire becomes deflated due to a large puncture, or blow out through which the air may escape more rapidly than it can be pumped into the tire.

A further object is to provide a pumping device of simple, inexpensive and durable construction, which can be readily applied to wheels and tires of usual construction, and one in which the pumping operation is dependent upon the compression of the tire at the point of contact with the surface of the road.

In order that the invention may be fully understood, reference will now be had to the accompanying drawing, in which:

Fig. 1 is a cross sectional view of a pneumatic tire and rim of a wheel equipped with one form of my device.

Fig. 2 is a detail partly in section of a modified form of pump.

Fig. 3 is a cross section of a pneumatic tire and the rim of a wheel equipped with another form of my device.

Referring more particularly to the structure disclosed by Fig. 1, A designates a pneumatic tire equipped with the usual inner tube B, and C designates a rim and D the felly of a wheel.

Located within the inner tube B is an air pumping means comprising a compressible member 2 consisting of rubber or other suitable material, and preferably of spherical formation. The member 2 is preferably molded in one piece and has a suitable number of communicating air compartments 4 connected by a passageway 6 which communicates with the inner end of an air duct 8 extending longitudinally through a valve stem 10 and provided at its outer end with an inlet port 12. The inlet port 12 is controlled by a suitable valve 14, in turn controlled by a spring 16 which tends to hold said valve in closed position.

The air duct 8, at a point adjacent to the spring 16, is provided with an outlet port 18 communicating with an air duct 20 leading from the outer end of the valve stem 10 to an outlet port 22 which discharges into the inner tube B. The outer end of the air duct 20 is controlled by a suitable valve 24, in turn controlled by a spring 26 which tends to hold the valve 24 to its seat. Spaced inwardly from the outlet port 18 is a suitable valve 28 which is controlled by a spring 30 and a stem 31, which latter is fixed to the valve 24. The upper end of the valve stem 10 is provided with a removable dust cap 32 having an air inlet port 34 and a screen 36, which latter is for the purpose of excluding dust from the inlet ports of the valves 14 and 24.

The inner end of the valve stem 10 is enlarged as indicated at 38 and forced into the outer end of the passageway 6 to hold the member 2 and the valve stem 10 in assembly. In order to prevent leakage of air from the member 2 around the enlarged end 38 of the valve stem 10 the latter is provided with a nut 39 which is screwed down firmly upon the intervening portion 40 of the member 2. The nut 39 has an air port 41 leading from the outlet port 22 of the duct 20 into the interior of the inner tube B. The valve stem 10 also has a nut 43 threaded thereon to engage the felly D and draw the nut 42 firmly against the inner surface of the wheel rim C.

In order to overcome any tendency of the compressible member 2 to creep upon the inner tube B said member is provided with a shoe 44 which may either frictionally engage the interior of said inner tube or be cemented thereto in any well-known manner.

The operation is as follows: Each time the tire meets the surface of the road and is compressed at the point adjacent to the member 2 it in turn compresses the latter, thereby forcing the air from the compartments 4 into the inner tube B by way of the passageway 6 and the duct 8, outlet port 18, duct 20, and outlet ports 22 and 41. During the foregoing operation the valves 14 and 24 are firmly held to their seats by their respective springs 16 and 26 and the pressure of the air forced from the member 2, while the valve 28 is opened by the air pressure in its passage from the outlet port 18 to the duct 20. As the tire A rotates it becomes relieved of the pressure at the point above mentioned and returns to normal shape at such point, thereby permitting the member 2 to return to normal. As the member 2 returns to normal shape it sucks in the outer atmosphere through the ports 34 and 12, and the duct 8. As the air is sucked in it opens the valve 14 which afterwards is closed by the spring 16 as the compartments 4 become filled with the air.

Should it be desirable at any time to inflate the inner tube B independently of the action of the member 2 it may be readily accomplished by removing the dust cap 32 and applying the nozzle of an air hose leading from a compressor to the outer end of the valve casing 44.

When it is desired to deflate the tire preparatory to removing it from the wheel rim C, the air may be permitted to escape by manually pressing the stem 31 inwardly to open the valves 24 and 28.

In the modified form of air pumping means disclosed by Fig. 2, a hollow spherical member 2a is provided with an air chamber 4a therein. In other respects the remainder of the construction may be substantially the same as that disclosed by Fig. 1.

In the form shown by Fig. 3, the chief difference resides in the construction of the air pumping means in which a piston 2b is substituted for the compressible member 2 of Fig. 1. The duct 8b of the modified form is enlarged to provide a cylinder for the reception of the reciprocatory piston 2b, which latter has a rod 46 extending into a projection 48 formed within the inner tube Bb. The outer end of the rod 46 is enlarged as indicated at 50 for securing it within the projection 48.

In addition to the projection 48, the inner tube Bb is provided with an enlargement 52 into which the lower end of the stem 10b is firmly anchored by its enlarged inner end 38b and a nut 42b, which latter is threaded upon said stem and screwed firmly into contact with the exterior of the enlargement 52. When the tire Ab is compressed at a point adjacent to the projection 48 it is apparent that the piston 2b will be forced upward and thereby discharge air from the duct 8b into the inner tube Bb through the port 18b and the duct 20b, the lower end of which latter communicates with the interior of the tube Bb. When the tire returns to its normal shape the piston 2b is drawn inwardly and thus sucks air into the duct 8b through the inlet ports 34b and 12b, the valve 14b being opened by the suction to allow the air to enter the duct 8b.

In addition to the projection 48 forming an anchorage for the piston rod 46 it also acts as a signal in the event of a blowout whereby the tire is deflated faster than it can be filled with air by the pumping means, as during each revolution of the deflated tire the projection 48 will contact the adjacent end of the stem 10b and thus create a jar which will signal the driver that the tire is flat.

While I have shown three forms of my invention I do not wish to be limited thereto but reserve all rights to such other forms and modifications thereof as properly fall within the spirit and scope of the invention as claimed.

Having thus described my invention, what I claim and desire to secure by Letters Patent, is:

1. In combination with a pneumatic tire, an automatic inflater comprising means actuated during deformation and restoration of the tire for sucking in the atmosphere and forcing it into the tire, a valve stem having two communicating ducts, one leading from said air sucking and forcing means to the outer end of the valve stem and the other leading from the outer end of the valve stem to the tire, a self-closing valve in the last mentioned duct adapted to prevent air in the tire from flowing backwardly into the air sucking and forcing means, another self-closing valve in the last mentioned duct adapted to prevent air forced from the air forcing and sucking means from escaping to atmosphere, the last-mentioned valve being also adapted to be manually opened, and means controlled by said last-mentioned valve for opening the first-mentioned valve.

2. In combination with a pneumatic tire, an automatic inflater comprising means actuated during deformation and restoration of the tire for sucking in the atmosphere and forcing it into the tire, a valve stem having two communicating ducts, one leading from said air sucking and forcing means to the outer end of the valve stem and the other leading from the outer end of the valve stem to the tire, an inlet valve in the first mentioned duct for admitting the atmosphere to the air sucking and forcing means, a self-closing valve in the other duct adapted to prevent air in the tire from flowing backwardly into the air sucking and forcing means, another self-closing valve in the last mentioned duct adapted to prevent air forced from the air forcing and sucking means from escaping to atmosphere, the last-mentioned valve being also adapted to be manually opened, and a stem on said last-mentioned valve whereby when the latter is opened it will also open the second-mentioned valve.

3. In combination with a pneumatic tire, an automatic inflater comprising a resilient member having an air compartment and adapted to be compressed during deformation of said tire to force air into the latter, a valve stem having two ducts, one leading from said resilient member and communicating with the other duct and the other leading from the outer end of the valve stem to the tire, a self-closing valve in the last mentioned duct to prevent air in the tire from flowing backwardly into the resilient member, another self-closing valve in the last mentioned duct adapted to prevent air forced from the resilient member from escaping to atmosphere, the last-mentioned valve being also adapted to be manually opened, and means controlled by said last-mentioned valve for opening the first-mentioned valve.

HARRY C. CRANDALL.